United States Patent [19]

Beutler et al.

[11] Patent Number: 5,012,827

[45] Date of Patent: May 7, 1991

[54] PROCESS FOR THE EXTRACTION OF ORGANIC COMPONENTS FROM SOLID MATERIALS

[75] Inventors: Hans J. Beutler, Willich; Hans J. Gahrs, Dusseldorf; Ulrich Lenhard; Franz Lurken, both of Krefeld, all of Fed. Rep. of Germany

[73] Assignee: Messer Griesheim GmbH, Fed. Rep. of Germany

[21] Appl. No.: 160,867

[22] Filed: Feb. 26, 1988

[30] Foreign Application Priority Data

Feb. 28, 1987 [DE] Fed. Rep. of Germany ....... 3706594

[51] Int. Cl.$^5$ .................. A24B 15/24; A24B 15/26
[52] U.S. Cl. .................................... 131/297; 131/298; 423/658.5
[58] Field of Search ............... 131/297, 900, 296, 291, 131/298; 423/658.5

[56] References Cited

U.S. PATENT DOCUMENTS

| | | | |
|---|---|---|---|
| 4,153,063 | 5/1979 | Roselius et al. | 131/297 |
| 4,506,682 | 3/1985 | Muller | 131/297 |
| 4,561,452 | 12/1985 | Gahrs | 131/297 |
| 4,714,617 | 12/1987 | Gahrs | 131/297 |
| 4,727,889 | 3/1988 | Niven et al. | 131/297 |

*Primary Examiner*—V. Millin
*Attorney, Agent, or Firm*—Connolly & Hutz

[57] ABSTRACT

In processes for high pressure extraction, a gaseous solvent under high pressure is conducted through an extractor filled with solid material and in this process takes on organic components from the solid materials. These are subsequently separated in a separator and the solvent is again delivered to the extractor. In particular, when gas mixtures having a reduced solvating power are used as solvent to increase the selectivity of the components to be dissolved out, high gas throughputs become necessary to produce a certain amount of product. In order to reduce the high gas throughputs, the solid materials are soaked with a gaseous solvent under high pressure without gas extraction before the circulation process begins. The solvent composition as well as the soaking conditions may deviate from the extraction conditions. In this process, prior to the extraction stage, the solid material in the extractor is soaked with a gaseous solvent under high pressure without the occurrence of a gas flow.

9 Claims, 2 Drawing Sheets

PROCESS FOR THE EXTRACTION OF ORGANIC COMPONENTS FROM SOLID MATERIALS

BACKGROUND OF THE INVENTION

The process for high pressure extraction has been known for many years from many publications. In high pressure extraction, the solvent properties of compressed gases or gas mixtures are utilized in many ways to dissolve and separate components from solid-like raw materials. The separated components are obtained as tracts or the raw material per se is purified as a result of the separation. Industrially realized applications of the process of high pressure extraction are, for example, the production of hops extract and the production of caffeine-free coffee. As example, U.S. Pat. No. 4,561,452 is mentioned which shows a process for the production of low nicotine tobacco.

High pressure extraction installation in the simplest case consist of an extractor and a separator through which the gaseous solvent in circulated. In the extractor, the gas under high pressure, mostly above-critical pressure, flows through the solid-like raw material and in this process is charged with certain organic content substances. These content substances can be selectively dissolved as a function of the set extraction conditions. The dissolved components leave the extractor together with the solvent flow and are separated in the separator. The separation can be achieved by various measure, namely, by pressure and temperature changed, by absorbers or wash solutions or by adding other gases which reduce the solvating power of the gaseous solvent.

From this basic process of high pressure extraction, many variations were developed employed to adapt the process to certain objectives or for economical optimization. Examples are the application of gas mixtures to attain higher selectivities and the application of several separation autoclaves operating at various pressure levels for the production of fractionated extracts.

All known variations have in common that the extraction process is operated exclusively as a circulation process. The extractors as well as the separators are, therefore, continuously included in the solvent circulation. Time-consuming extraction processes, in particular, therefore require high energy expenses and considerable investment for the layout of pumps. This applies, in particular, when the solvating power of the solvent is reduced by the addition of foreign gases to increase the selectivity.

SUMMARY OF INVENTION

The invention is based on the objective of providing a process fore high pressure extraction which requires smaller gas throughputs than needed thus far and, in addition to the resulting better economy, makes qualitatively better extraction results possible.

The process of the invention is especially advantageous for cases operating with solvent mixtures to improve the selectivity. This requires, in general, a much higher solvent throughput. The invention is, however, not limited to these cases but can also be employed when the solvent consists only of one component. The condition in the conditioning phase may be identical to the conditions in the subsequent extraction stage, in other words, the same solvent is used under the same pressure and temperature conditions. But the conditions may also differ so that, in particular, with the use of solvent mixtures, a number of variations is possible. These modifications of the process affect, in particular, the selectivity, in other words, the composition of the components each time dissolved out.

Since the extraction phase is often shorter than the conditioning phase, the various steps of the process according to the invention can be conducted parallel in various autoclaves. The layout of the compressor and heat exchanger, therefore, does not have to be related to the total volume of the autoclaves but can be limited to the volume present in the circulation. This results in considerable savings.

An especially advantageous process results from the use of solvent mixtures when in the conditioning stage a solvent having an especially high solvating power is used, for example, little diluted carbon dioxide or even pure carbon dioxide and in the subsequent extraction stage a solvent mixture having a high selectivity action, for example, carbon dioxide having a very high nitrogen fraction is used. The conditioning time as a result of the better solvating power is clearly shorter. In the transition to the extraction process, the solvent for the circulation process can be directly formed from the solvent of the conditioning phase by adding a component, for example, nitrogen.

Not only the composition but also the pressure and temperature of the solvent can be set in the conditioning stage near the solubility maximum of the component to be extracted in such a way that the conditioning effect is attained and also the secondary condition of selectivity is retained. During the conditioning phase the pressure and temperature in the autoclave may also be slowly changed.

It is finally also possible to successively subject one and the same solid material several times to the conditioning process and the high pressure extraction. In general, the conditioning process, in these variation possibilities, is an independent process stage which can also be independently optimized in it conditions.

THE DRAWINGS

DETAILED DESCRIPTION

Figure 1:
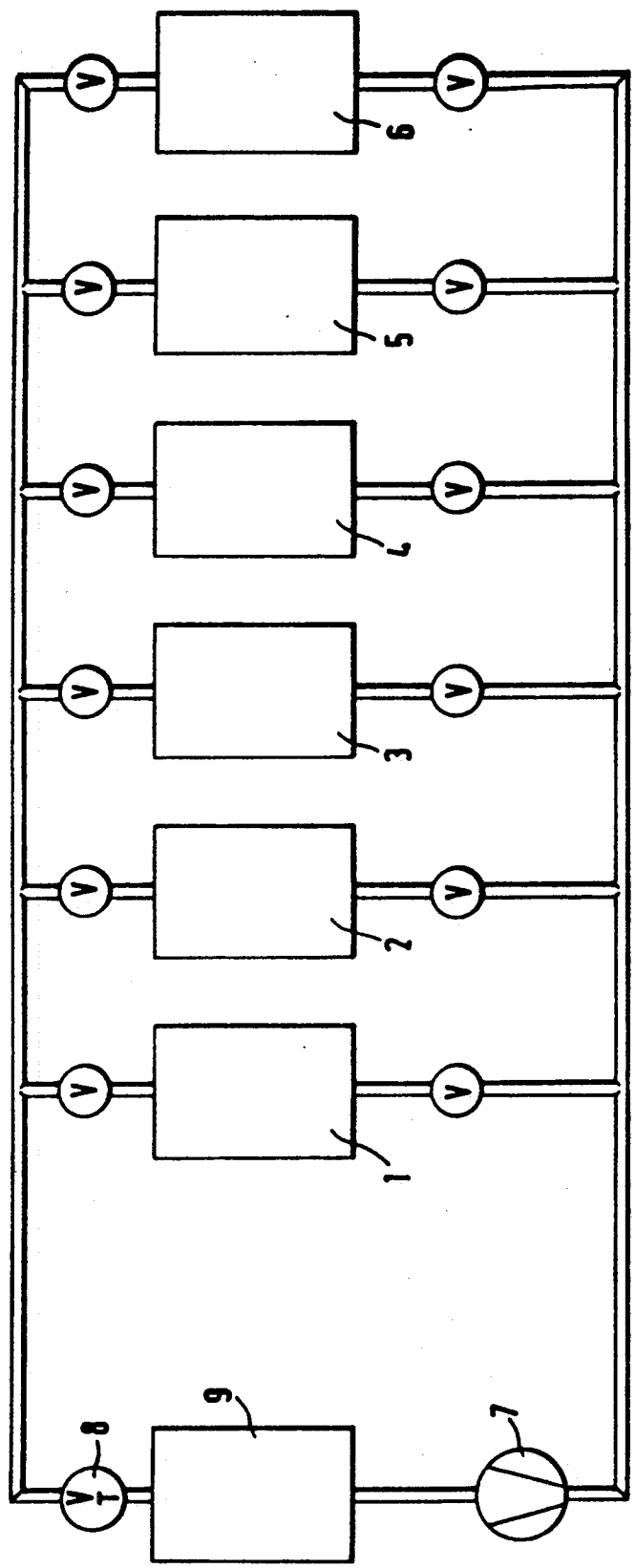
FIG. 1 shows a simplified process diagram with six autoclaves for the conditioning stage in accordance with this invention.

FIG. 1 shows a simplified diagram for conducting the process of the invention, containing six autoclaves (1 to 6) in which the conditioning process is conducted. By opening the valves (not separately provided with reference numbers) each autoclave can be included in the circulation and is then used as extractor.

In the present case, extraction takes place in the autoclave 3. The gaseous solvent is compressed to the extraction pressure by the compressor 7, flows through the autoclave 3 and is charged in this process with organic components from the solid materials located in the autoclave. Since the solvent is charged only with the organic components from the solid materials rather than also being charged with the extract, this conditioning process might be termed a soaking in that the solvent does not flow through the material. The charged solvent is expanded through the valve 8 in the separtor 9 so that the solids are separated and can be withdrawn from the separator 9. The solvent is again delivered to the compressor 7. The solid materials in the autoclave 1 and 4 to 6 are, meanwhile, under conditioning conditions. The autoclave 2 is being filled with new solid material.

Figure 2:
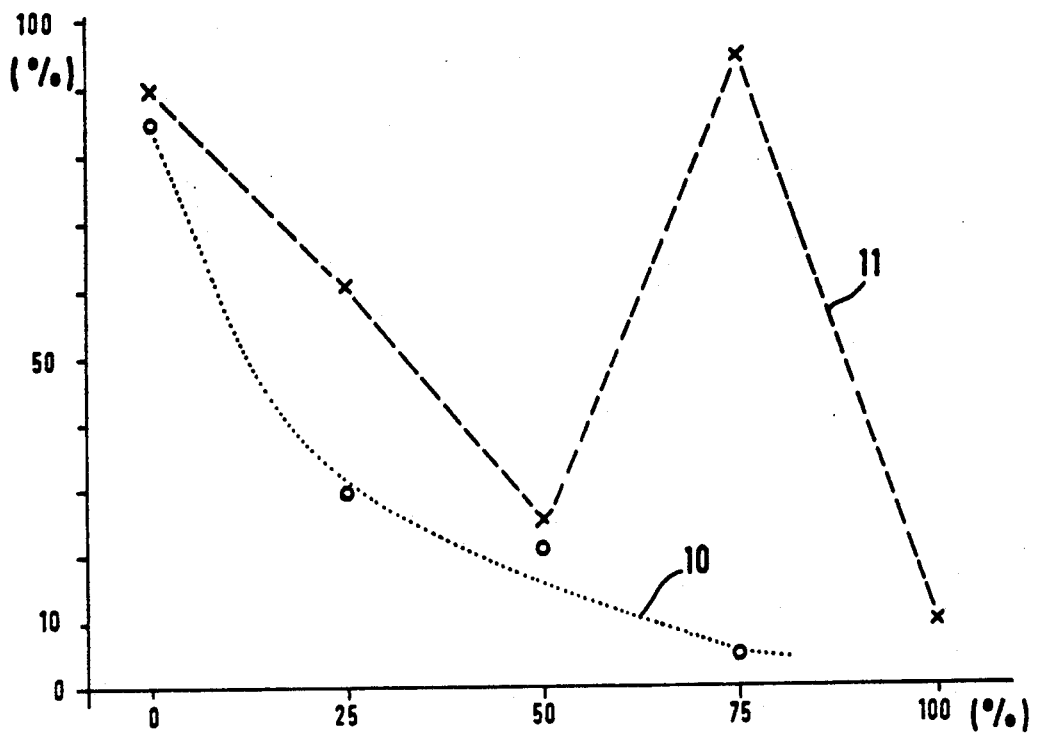
FIG. 2 shows the results of the reduction of nicotine and aromatic substances from tobacco with different composition carbon dioxide and nitrogen mixtures.

FIG. 2 shows the results of the selective extraction of nicotine from tobacco by means of gas mixture using the process known from U.S. Pat. No. 4,561,452. With the known process, it could be observed that even at high gas throughputs through the extraction autoclaves (300 kg gas/kg product), the nicotine reduction was not uniformly and overall reliably brought to the targeted values. These problems could be eliminated by the process of the invention with additional conditioning stage. During the conditioning stage, the tobacco is in the autoclave without gas circulation under extraction conditions. The standard extraction phase follows the conditioning phase. The desired nicotine reduction is a function of the total operating time of the two stages. The result is a wholly homogeneous and aroma-preserving denicotizing of the tobacco illustrated in FIG. 2. Curve 10 shows the aroma reduction and curve 11 the nicotine reduction in percents as a function of the gas composition starting, with 100% carbon dioxide to 100% nitrogen. Optimum values are obtained at a solvent composition of 25% carbon dioxide and 75% nitrogen.

In this case, the nicotine reduction is almost complete while the aromatic substances are largely retained. Compared to the process known from U.S. Pat. No. 4,561,452, this is a considerable improvement.

Figure 3:
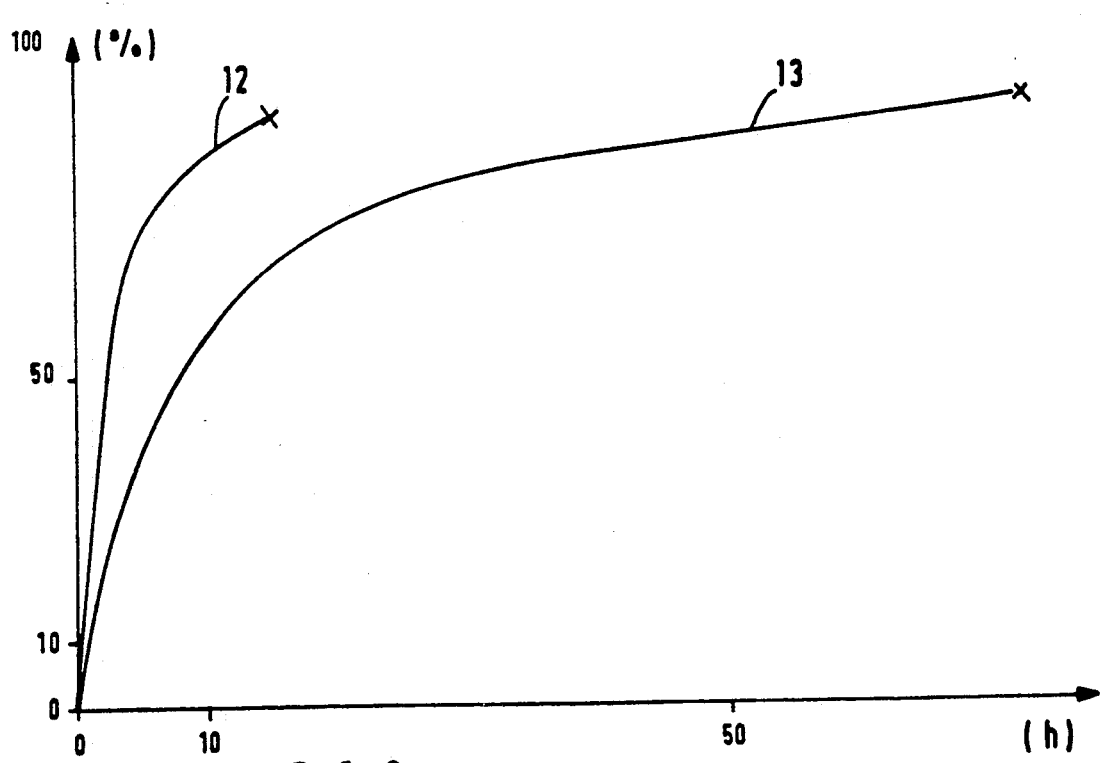
FIG. 3 shows the shorter conditioning time with the use of pure carbon dioxide as compared to a carbon dioxide and nitrogen mixture.

FIG. 3 shows how the total operating time of the extraction can be reduced by the use of different gases in the conditioning stage for the same selectivity. The nicotine reduction is again indicated in percents and the total operating time in hours. Curve 12 shows the total operating time with the use of 100% carbon dioxide in the conditioning or soaking stage, curve 13 shows the total operating time with the use of a gas mixture consisting of 25% carbon dioxide and 75% nitrogen in the conditioning soaking stage.

What is claimed is:

1. In a process for the extraction of organic components from solid materials including the steps of flowing a gaseous solvent under high pressure through an extractor filled with solid material having organic components to be separated, charging the solvent with the organic components from the material, flowing the charged solvent to a separator where the organic components are separated from the solvent, repeating the steps of delivering the gaseous solvent back to the extractor and then to the separator for subsequent extraction and separation stages, the improvement being in that prior to the extraction stage wherein the solvent is charged with the organic components, the solid material in the extractor is soaked with a gaseous solvent under high pressure without gas circulation, and the gaseous solvent used in the extraction stage and for the soaking stage having the same components.

2. Process according to claim 1, characterized in that after the soaking is completed the solvent for the extraction stage is formed by adding a component.

3. Process according to claim 2, characterized in that the pressure and/or temperature of the solvent of the soaking stage are changed during soaking.

4. Process according to claim 3, characterized in that the same solid material is successively subjected to the soaking process and the high pressure extraction.

5. Process according to claim 2, characterized in that the same solid material is successively subjected to the soaking process and the high pressure extraction.

6. Process according to claim 1, characterized in that the same solid material is successively subjected to the soaking process and the high pressure extraction.

7. Process according to claim 1, characterized in that the same solid material is successively subjected to the soaking process and the high pressure extraction.

8. Process according to claim 1, characterized in that the pressure and/or temperature of the solvent of the soaking stage are changed during soaking.

9. Process according to claim 1, characterized in that the pressure and/or temperature of the solvent of the soaking stage are changed during soaking.

* * * * *